United States Patent Office 3,006,754
Patented Oct. 31, 1961

3,006,754
PRODUCTION OF SUPERPHOSPHATE FERTILIZERS
Robert E. Sullivan, Anaconda, Mont., assignor to The Anaconda Company, a corporation of Montana
No Drawing. Filed Apr. 15, 1959, Ser. No. 806,459
4 Claims. (Cl. 71—41)

This invention relates to phosphatic fertilizers and, more particularly, to the manufacture of treble superphosphate having an average phosphate content equivalent to at least about 50 percent $P_2O_5$ by weight. The invention provides a process for the production of an especially high-grade treble superphosphate from phosphate rock and either limestone or burned lime.

The production of high-grade treble superphosphate fertilizers has become increasingly commercially important with the advent of rising freight costs since these fertilizers contain a higher concentration of water-soluble phosphates and therefore require less shipping space per ton of "available" phosphate than do the standard phosphatic fertilizers. Treble superphosphate fertilizers generally have an available phosphate content from 41 to 45 percent by weight (calculated as $P_2O_5$) and are produced by the acidulation of ground phosphate rock with a relatively concentrated phosphoric acid solution, the primary reaction being the conversion of the insoluble tricalcium phosphate contained in the rock, $Ca_3(PO_4)_2$, to the more readily soluble monocalcium phosphate, $$Ca(H_2PO_4)_2$$

in which form the phosphate is available to the plant when the fertilizer is distributed throughout the soil.

The proportion of phosphoric acid used to acidulate the phosphate rock is usually regulated so that the total phosphatic content of the acid and of that fraction of the phosphate in the rock capable of reacting with the acid is such that its ratio to the lime content of the rock approximates the $P_2O_5/CaO$ ratio in monocalcium phosphate. Even under the most ideal operating conditions, however, the conversion of tricalcium phosphate in the rock to monocalcium phosphate is incomplete, and the product must be set aside in aging sheds for periods ranging from 14 to 30 days to improve the yield. Under the most favorable circumstances, treble superphosphate fertilizers produced commercially by the acidulation of phosphate rock with phosphoric acid will contain a maximum available phosphate content equivalent to no more than about 45 percent by weight of phosphorus pentoxide.

Incomplete conversion of the tricalcium phosphate in the rock to monocalcium phosphate generally results in a fertilizer product containing a relatively large concentration of residual unreacted phosphoric acid which, although it is water soluble and hence part of the available phosphate content of the product, imparts a distinctly sticky feel to the product. Superphosphate fertilizers containing concentrations of residual unreacted phosphoric acid in excess of about 5 percent by weight usually have a pronounced tendency to form large lumps and undergo caking. Even after the product has been aged and dried, the residual unreacted phosphoric content may be sufficiently high to cause the product to absorb moisture and to cake on prolonged storage.

Several attempts have been made to produce treble superphosphates by reacting a mineral containing calcium carbonate or calcium oxide with concentrated solutions of phosphoric acid, since the conversion of calcium carbonate or of calcium oxide with phosphoric acid to monocalcium phosphate proceeds very nearly to theoretical completion. Attention, for the most part, has been directed toward producing high-grade treble superphosphates by reacting phosphoric acid with crushed limestone, using phosphoric acid solutions containing about 85 percent $P_2O_5$ by weight. The reaction product resulting from treatment of the limestone with such concentrated phosphoric acid stiffens almost immediately and hardens substantially within minutes after mixing the limestone and the concentrated phosphoric acid. Removal of this stiffened or hardened mass from the reaction vessel can be accomplished only by tedious effort.

The present invention provides an improved process for the production of an especially high-grade treble superphosphate having an available phosphate content equivalent to at least about 50 percent by weight of $P_2O_5$ by the reaction of calcium carbonate (limestone) or calcium oxide (burned lime) with phosphoric acid, which avoids the difficulty of rapid stiffening of the reaction mixture heretofore encountered. I have found that by reacting either the crushed limestone or burned lime in a reaction vessel with a phosphoric acid solution containing not more than about 42 percent $P_2O_5$ by weight, in proportions such that the $P_2O_5/CaO$ in the reaction mixture is between 2.55 and 2.65, it is possible to attain substantially complete conversion of the calcium carbonate (or calcium oxide) to monocalcium phosphate without premature solidifying of the reaction mass in the reaction vessel. The reaction mixture may be withdrawn from the reaction vessel while it is still a readily flowing fluid, and then may be allowed to solidify to form an especially high-grade treble superphosphate in which the available phosphate content is equivalent to at least 50 percent $P_2O_5$ by weight and in which, on a dry basis, the free acid content is only about 2 percent by weight and, in many cases, even lower.

This product has been found to be quite free from the usual gumminess and stickiness generally associated with uncured superphosphate fertilizers. Because the free acid content is so low, the product may be bagged directly after production, and it may be stored over long periods of time without caking or showing any tendency to chemically attack the bags in which it is stored and shipped. Treble superphosphate fertilizers produced in accordance with the process of the invention need not be aged or cured, since the reaction between the phosphoric acid and limestone (or burned lime) proceeds quickly to substantial completion, with yields of 95 to 99 percent of theory.

Accordingly, the invention provides a process for the production of a treble superphosphate fertilizer having an available phosphate content equivalent to at least about 50 percent $P_2O_5$ by weight which comprises reacting phosphoric acid at a concentration equivalent to not more than about 42 percent $P_2O_5$ by weight in a reaction vessel with either crushed limestone or burned lime in proportions such that the $P_2O_5/CaO$ ratio in the reaction mixture is between 2.55 and 2.65, withdrawing the mixture while still fluid from the reaction vessel, and allowing the withdrawn reaction product to set, thereby forming a treble superphosphate in which the available phosphate content is equivalent to at least about 50 percent $P_2O_5$ by weight and in which, on a dry basis, the $P_2O_5/CaO$ ratio is between 2.4 and 2.5 and the residual unreacted phosphoric acid content is less than about 2 percent by weight.

To produce the phosphoric acid solution (less than 42 percent $P_2O_5$) with which the limestone or burned lime is reacted, mine-run phosphate rock, generally assaying 25 to 35 percent phosphates (calculated as $P_2O_5$), is crushed and ground to minus 100 mesh (Tyler screen series). The ground rock is leached with a stoichiometric amount of sulfuric acid in an agitated tank to produce a slurry of gypsum in phosphoric acid. The main reaction involves the conversion of the tricalcium phosphate in the phosphate rock by sulfuric acid to gypsum and phosphoric acid, according to the following equation:

$$Ca_3(PO_4)_2 + 3H_2SO_4 + 6H_2O \rightarrow 3(CaSO_4 \cdot 2H_2O)\downarrow + 2H_3PO_4 \quad (1)$$

Following the removal of gypsum by decantation and filtration, the phosphoric acid filtrate is concentrated (usually under vacuum) until its phosphoric acid content is equivalent to not more than about 42 percent $P_2O_5$ by weight. Although phosphoric acid as initially produced prior to concentration by evaporation (in which the phosphoric acid concentration is equivalent to about 32 or 33 percent by weight of $P_2O_5$) may be used to react with limestone or burned lime in the process of this invention, the rate of the reaction is slower and the product initially is wetter and solidifies more slowly than when a phosphoric acid solution containing about 40 to 42 percent $P_2O_5$ by weight is employed.

The phosphoric acid produced as described above is reacted with crushed limestone or burned lime. The reaction is carried out by mixing the phosphoric acid solution with the crushed limestone or burned lime in an agitated reaction vessel. The limestone or burned lime should be low in silica and other non-reactive constituents which would objectionably dilute the product. Preferably a limestone containing at least 50 percent CaO by weight, or burned lime containing at least 85 percent CaO by weight, is employed. The proportion of limestone (or burned lime) to the phosphoric acid added to the reaction vessel is such that the $P_2O_5/CaO$ ratio in the reaction mixture is between 2.55 and 2.65 (corresponding to a slight excess of acid). The reaction of calcium carbonate with the phosphoric acid solution results in essentially quantitative conversion of the reactants to monocalcium phosphate, according to the following equation:

$$CaCO_3 + 2H_3PO_4 \rightarrow Ca(H_2PO_4)_2 + CO_2\uparrow + H_2O \quad (2)$$

The reaction of burned lime, which consists essentially of calcium oxide, with the phosphoric acid solution also results in essentially quantitative conversion of the reactants to monocalcium phosphate, according to the following reaction:

$$CaO + 2H_3PO_4 \rightarrow Ca(H_2PO_4)_2 + H_2O \quad (3)$$

Following the admixture of limestone with the phosphoric acid solution, the temperature of the reaction mixture rapidly increases to above 100° F. When burned lime is used, the temperature may increase to above 200° F., for the burned lime possesses a higher calcium oxide content than does limestone and none of the heat of reaction is carried away by escaping gas. In either case, however, it is desirable to maintain the temperature of the reaction mixture below about 200° F. in order to insure against the formation of any dicalcium pyrophosphate in the reaction mixture.

The reaction proceeds very rapidly so that usually no more than ten minutes of agitation of the mixture in the reaction vessel is necessary. Then, while the reaction mixture is still fluid and readily flowable, it is withdrawn from the reaction vessel onto a conveyor belt, a setting floor, or other receiver where the withdrawn mass is allowed to set. The set product does not need to be aged, but after it has set it is preferably dried, for example in a rotary or multiple hearth drier.

The set and dried product is a solid treble superphosphate which contains an available phosphate content equivalent to at least about 50 percent $P_2O_5$ by weight and only a negligible or trace amount of citrate-insoluble phosphate. The free acid content of the treble superphosphate fertilizer, representing the residual unreacted phosphoric acid in the product, is less than about 2 percent by weight and in many instances may not exceed even 1 percent by weight. Because the residual unreacted phosphoric acid content is so low, treble superphosphates produced in accordance with the invention are free from the gumminess and sticky feel which generally characterizes uncured superphosphate fertilizers. The $P_2O_5/CaO$ ratio of the product is in the range of 2.4 to 2.5, corresponding to only a low percentage (1 percent to 5 percent) of unreacted lime.

The treble superphosphate fertilizer may be bagged immediately after drying and need not be aged or cured prior to shipment. Since the free acid content is exceptionally low, the product is stable upon storage and neither undergoes caking nor shows any tendency to chemically attack the paper bags in which it is usually shipped.

To illustrate the improvements obtained in the production of treble superphosphate fertilizers from phosphate rock and limestone (or burned lime) in accordance with the process of the invention, an example of a preferred embodiment of this process is described below.

Phosphoric acid solution produced by acidulating ground phosphate rock with sulfuric acid and having a phosphoric acid content equivalent to 33 to 34 percent $P_2O_5$ by weight was evaporated in a series of Swenson vacuum evaporators until the concentration of acid was built up to 40.1 percent $P_2O_5$ by weight. The resulting concentrated phosphoric acid was held for a time in a storage tank. From the storage tank it was introduced into a reaction tank equipped with a mechanical agitator, and crushed limestone containing 51.8 percent CaO was fed gradually into the acid in the tank. The amount of reactants charged into the tank were such that the ratio of $P_2O_5$ (from the acid) to CaO (from the limestone) in the final reaction mixture was 2.63, corresponding to about 3.5 percent excess acid. Soon following the addition of the limestone to the concentrated phosphoric acid, the temperature of the reaction mixture rapidly increased from 76° F. to 108° F., and vigorous ebullition of carbon dioxide occurred throughout most of the duration of the reaction.

Agitation of the reaction mixture was continued for about ten minutes, by which time the reaction was substantially completed. The reaction mixture was then discharged onto a slowly advancing conveyor belt, on which it soon set to solid form. As the belt advanced over its end sheave, the solidified product (treble superphosphate) broke up into easily handled lumps. The lumps were dried in an oil-fired, rabbled multiple hearth drier, in the course of which they were broken down to a granular product of approximately uniform particle size. The dried product was bagged for shipment as a high-grade treble superphosphate fertilizer.

The treble superphosphate thus produced had a total phosphate content of 50.3 percent by weight and a water-soluble phosphate content of 38.4 percent (both calculated as $P_2O_5$), and only a trace amount of citrate-insoluble phosphate. The overall $P_2O_5/CaO$ ratio in the dried product was 2.50, corresponding to a yield of 98.5 percent of theory. The free acid content of the dried product, which represents the concentration of unreacted residual phosphoric acid in the product, was only 1.1 percent by weight.

Because of the low free acid content of the product, it was quite free of the gumminess and stickiness generally associated with uncured superphosphate fertilizers, and could be dried easily without balling in the drying equipment.

While the process has been particularly exemplified above with respect to the use of limestone, similar results are obtained with the use of burned lime as a source of calcium oxide. The only substantial differences are that the temperature of the reaction mixture, when burned lime is used, increases to about 200° F. or higher, and there is of course no ebullition of carbon dioxide. If the temperature of the reaction mixture is maintained below 200° F., the treble superphosphate fertilizer produced with the use of burned lime has the same high available phosphate content, low citrate-insoluble phosphate, and low free acid content that characterizes the product produced from limestone.

I claim:

1. A process for the production of a treble superphosphate having an available phosphate content equivalent to at least about 50 percent $P_2O_5$ by weight which consists essentially of reacting phosphoric acid at a concentration equivalent to from about 40 to about 42 percent $P_2O_5$ by weight in a reaction vessel with a crushed mineral selected from the group consisting of burned lime and limestone in proportions such that the $P_2O_5/CaO$ ratio in the reaction mixture is between 2.55 and 2.65, and discharging the mixture while still fluid from the reaction vessel onto a moving conveyor, the discharged product solidifying while moving on said conveyor to form a solid treble superphosphate in which the available phosphate content is equivalent to at least about 50 percent $P_2O_5$ by weight and in which, on a dry basis, the $P_2O_5/CaO$ ratio is between 2.4 and 2.5 and the residual unreacted phosphoric acid content is less than about 2 percent by weight.

2. A process for the production of a treble superphosphate having an available phosphate content equivalent to at least about 50 percent $P_2O_5$ by weight which consists essentially of reacting phosphoric acid at a concentration equivalent to from about 40 to about 42 percent $P_2O_5$ by weight in a reaction vessel with a crushed mineral selected from the group consisting of burned lime and limestone in proportions such that the $P_2O_5/CaO$ ratio in the reaction mixture is between 2.55 and 2.65, agitating the mixture in the reaction vessel and maintaining the temperature thereof below 200° F., and discharging the mixture while still fluid from the reaction vessel onto a moving conveyor, the discharged product solidifying while moving on said conveyor to form a treble superphosphate in which the available phosphate content is equivalent to at least about 50 percent $P_2O_5$ by weight and in which, on a dry basis, the $P_2O_5/CaO$ ratio is between 2.4 and 2.5 and the residual unreacted phosphoric acid content is less than about 2 percent by weight.

3. A process for the production from phosphate rock of a treble superphosphate fertilizer having an available phosphate content equivalent to at least about 50 percent $P_2O_5$ by weight which consists essentially of treating ground phosphate rock with sulfuric acid and concentrating the resulting phosphoric acid to from about 40 to about 42 percent $P_2O_5$ by weight, reacting the phosphoric acid at such concentration in a reaction vessel with crushed limestone in an amount such that the $P_2O_5/CaO$ ratio in the reaction mixture is between 2.55 and 2.65, agitating the mixture in the reaction vessel and maintaining the temperature of the mixture between 100° F. and 200° F., and discharging the mixture while it is still fluid from the reaction vessel onto a moving conveyor, the discharged mixture solidifying while moving on said conveyor to form a treble superphosphate fertilizer in which the available phosphate content is equivalent to at least about 50 percent $P_2O_5$ by weight and in which, on a dry basis, the $P_2O_5/CaO$ ratio is between 2.4 and 2.5 and the residual unreacted phosphoric acid content is less than about 2 percent by weight.

4. A process for the production from phosphate rock of a treble superphosphate fertilizer having an available phosphate content equivalent to at least about 50 percent $P_2O_5$ by weight which consists essentially of treating ground phosphate rock with sulfuric acid and concentrating the resulting phosphoric acid to from about 40 to about 42 percent $P_2O_5$ by weight, reacting the phosphoric acid at such concentration in a reatcion vessel with crushed burned lime in an amount such that the $P_2O_5/CaO$ ratio in the reaction mixture is between 2.55 and 2.65, agitating the mixture in the reaction vessel and maintaining the temperature of the mixture between 100° F. and 200° F., and discharging the mixture while it is still fluid from the reaction vessel onto a moving conveyor, the discharged mixture solidifying while moving on said conveyor to form a treble superphosphate fertilizer in which the available phosphate content is equivalent to at least about 50 percent $P_2O_5$ by weight and in which, on a dry basis, the $P_2O_5/CaO$ ratio is between 2.4 and 2.5 and the residual unreacted phosphoric acid content is less than about 2 percent by weight.

References Cited in the file of this patent

UNITED STATES PATENTS

| | | |
|---|---|---|
| 1,940,689 | Moore | Dec. 26, 1933 |
| 2,067,538 | MacIntire | Jan. 12, 1937 |
| 2,086,565 | MacIntire | July 13, 1937 |
| 2,137,674 | MacIntire | Nov. 22, 1938 |